(12) United States Patent
Matsushima et al.

(10) Patent No.: US 6,831,425 B2
(45) Date of Patent: Dec. 14, 2004

(54) XENON DISCHARGE LAMP LIGHTING DEVICE

(75) Inventors: Takeo Matsushima, Hyogo (JP); Yoichiro Higashimoto, Hyogo (JP); Kyosuke Fujina, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/270,609

(22) Filed: Oct. 16, 2002

(65) Prior Publication Data
US 2003/0071585 A1 Apr. 17, 2003

(30) Foreign Application Priority Data
Oct. 17, 2001 (JP) .................. 2001-319144

(51) Int. Cl.[7] .............. H05B 41/24; H05B 37/02
(52) U.S. Cl. ...................... 315/287; 315/307
(58) Field of Search .................. 315/287, 307, 315/209 R, 219, 224, 276, 279, 291; H05B 41/24, 37/02

(56) References Cited

U.S. PATENT DOCUMENTS

| | | | |
|---|---|---|---|
| 5,939,838 A | * 8/1999 | Janik | 315/277 |
| 5,949,199 A | * 9/1999 | Qian et al. | 315/307 |
| 6,356,018 B1 | 3/2002 | Higashimoto et al. | 313/623 |
| 6,424,099 B1 | * 7/2002 | Kirkpatrick et al. | 315/248 |
| 2001/0010447 A1 | 8/2001 | Yamane et al. | 313/113 |

FOREIGN PATENT DOCUMENTS

JP 2000-215995 8/2000 ......... H05B/41/282

* cited by examiner

Primary Examiner—Don Wong
Assistant Examiner—Trinh Vo Dinh
(74) Attorney, Agent, or Firm—Rader, Fishman & Grauer PLLC

(57) ABSTRACT

It is an object to provide a xenon discharge lamp lighting device with few or no lamp startup lighting failures, even when a xenon discharge lamp is near the end of its useful life. In the xenon discharge lamp, when a lamp voltage increases, from the ending point of the rush current supply time period, occurring upon starting a xenon discharge lamp lighting igniter, for a preset specified time T, the input power is increased in accordance with the lamp voltage increase amount, whereby constant power control is provided thereafter.

4 Claims, 4 Drawing Sheets

XENON DISCHARGE LAMP LIGHTING DEVICE

DETAILED EXPLANATION OF THE INVENTION

1. Field of the Invention

This invention relates to a xenon discharge lamp lighting device, more specifically a xenon discharge lamp lighting device for lighting a xenon discharge lamp used as a light source for projection type image devices such as direct reflection projection digital projectors, polarized reflection projection digital projectors, etc.

2. Description of the Related Art

The picture projection light source for an image projection device (projector) is used, for example, in movie theaters. This device conventionally uses a large xenon discharge lamp. The main lighting device used for lighting the xenon discharge lamp is a constant current control model that controls the input current such that the value is constant.

In a constant current control lighting device, a stable start for a xenon discharge lamp nearing the end of its lamp life requires a stronger current than the rated drive current to be supplied to the xenon discharge lamp. For this reason, a large model is used for the xenon discharge lamp lighting device, with high maximum input power and capable of supplying a strong current.

Meanwhile, in recent years, direct reflection or polarized reflection projection digital projectors have been developed as small image projection devices. The light source used in these projection digital projectors is a xenon discharge lamp with a high charged pressure of xenon gas, such as a xenon discharge lamp for which the xenon gas charged pressure upon lighting is at least 1.5 times that of a xenon discharge lamp used in a large image projection device.

Because this type of image projection device can be easily installed in a small space, it is well suited as an image projection device to be used in exhibit halls and other locations.

Thus, when actually using a small image projection device such as a projection digital projector in an exhibit hall or other location, there is a demand from a space-saving standpoint for a small lighting device for lighting the xenon discharge lamp, which is the light source for the image projection device. Also, exhibit halls have often already allocated the power available for use in each booth. Therefore, instead of a large model current-controlled lighting device with high maximum input power, a small model constant power-controlled lighting device is used, controlling the input current such that the input power value is constant.

However, when using a constant-power controlled lighting device for lighting a xenon discharge lamp in a projecting digital projector, a lighting failure can easily occur when starting the lamp, and lamp lighting failures occur frequently at startup, particularly in a xenon discharge lamp nearing the end of its useful life. Possible causes of such lamp lighting failure occurrences are as follows. FIG. 4 indicates changes in input power, input current, and lamp voltage immediately after starting a lamp. A lighting failure occurs after starting a xenon discharge lamp using a conventional constant power-controlled lighting device.

In FIG. 4, the left vertical solid line t1 indicates a point in time prior to starting a xenon discharge lamp. At the point in time indicated by this solid line t1, both the lamp input power and lamp current are 0. As for the lamp voltage, for a xenon discharge lamp with a rated drive lamp voltage of around 25V, for example, a no-load voltage of about 130V is applied.

Also, the left vertical dotted line t2 indicates the startup of a lighting igniter. With the startup of the lighting igniter, a dielectric breakdown occurs between the electrodes of the xenon discharge lamp, followed by a rush current. The rush current supply time period To is a minimum of 400 microseconds, and no special electrical control can be made during this supply time period.

The right vertical dotted line t3 is the ending time for the rush current supply time period, as well as the point where electrical control begins for lighting the xenon discharge lamp. Conventionally, constant power control begins at the point in time indicated by this dotted line t3.

As based on FIG. 4, immediately after the lamp startup, the thermionic discharge from the electrodes is insufficient, making the arc formed between the electrodes unstable. In addition, convection of xenon gas sealed with a high charging pressure causes the arc to waver, which further destabilizes the arc and lengthens the discharge distance, thus increasing the lamp voltage as shown by label (a). And in a constant power-controlled lighting device, the input current is controlled downward when the lamp voltage increases, as indicated by label (b), thus further destabilizing the arc. As a result, the lamp voltage increases further as shown with label (c), and the input current is controlled downward again as shown with label (d). Repeating this bad cycle results in the xenon discharge lamp light going out before a stable arc is formed.

SUMMARY OF THE PRESENT INVENTION

The present invention is based on the circumstances described above, and proposes to provide, as a lighting device for lighting a xenon discharge lamp used in a projecting image device, a xenon discharge lamp lighting device that has few or no lighting failures upon starting the lamp, even when lighting it near the end of its useful life, and which is also small with a low maximum input voltage.

The xenon discharge lamp lighting device in the present invention is characterized by, in a lighting device for lighting a xenon discharge lamp used in a projecting image device, when lamp voltage increases between the ending point of the rush current supply time period, occurring upon starting a xenon discharge lamp lighting igniter, until a preset specified time period T has passed, increasing the input voltage in accordance with said lamp voltage increase amount, and thereafter providing constant current control.

In the xenon discharge lamp lighting device of the present invention, from the ending point of the rush current supply period, which occurs upon startup of the igniter for lighting the xenon discharge lamp, until a specified time T has passed, it is preferable for the input current to be controlled to 80–150% of the input current during rated drive.

Also, in the xenon discharge lamp lighting device of the present invention, it is preferable for the preset specified time T to be 50 milliseconds or more.

Using the composition above, after the xenon discharge lamp is started and immediately after the rush current supply period is complete, the input power would be increased according to the lamp voltage increase amount in the xenon discharge lamp. Therefore, even if the lamp voltage increases due to a destabilized arc, the input current does not decrease in response.

This allows reliable stabilization of the arc, which prevents or controls the occurrence of lighting failures upon lamp startup even when lighting a xenon discharge lamp near the end of its useful life.

In addition, after specified time T passes after the completion of the rush current supply time period occurring after starting the xenon discharge lamp, there is constant power control, making excessive input power unnecessary, which allows smaller maximum input power and decreased device size.

DETAILED DESCRIPTION OF THE PREFERRED EMBODIMENTS

A detailed explanation is provided below regarding an embodiment of the xenon discharge lamp lighting device in the present invention.

Figure 1:
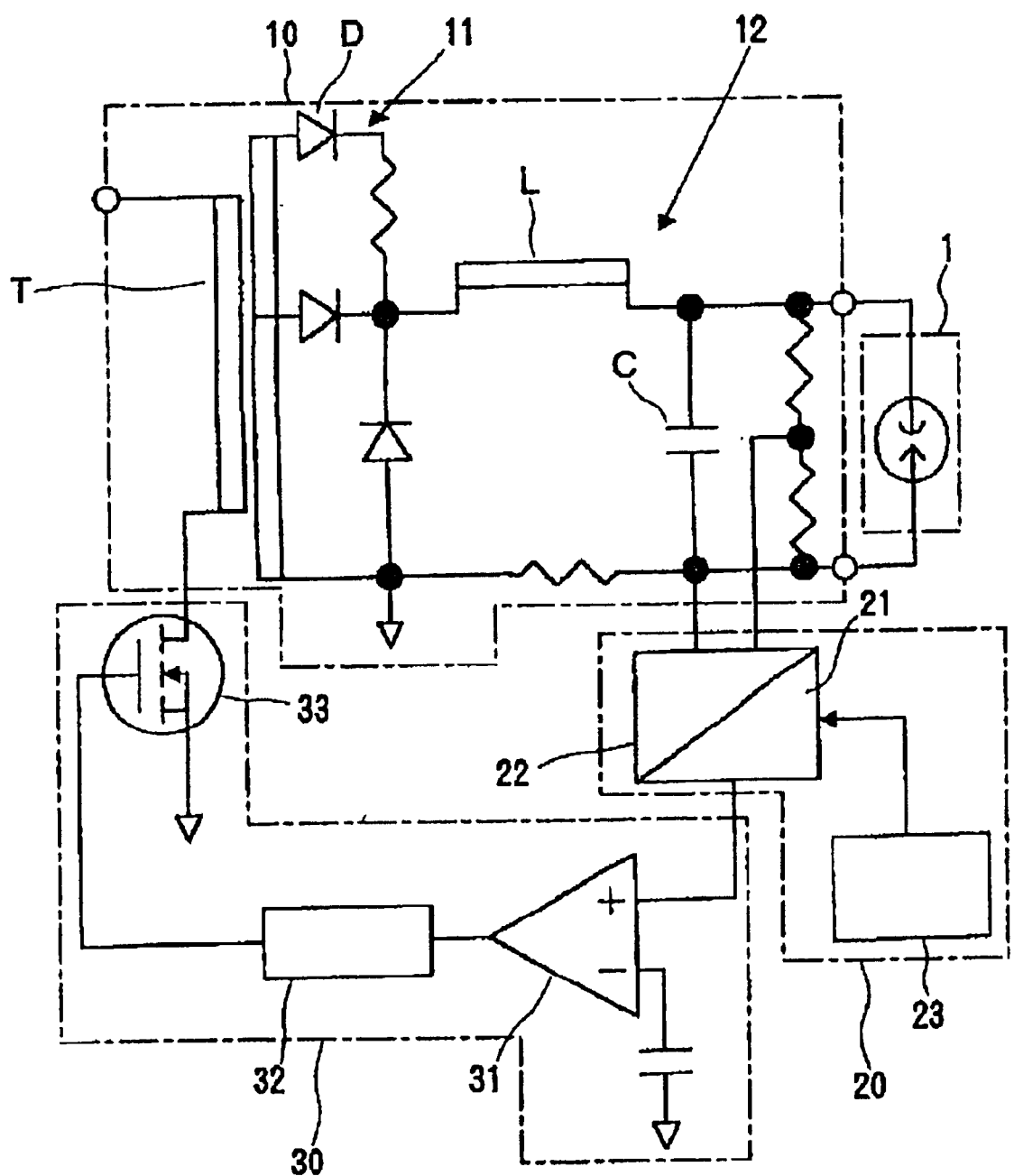
FIG. 1 is a circuit diagram showing an example of a main structure of the xenon discharge lamp lighting device in the present invention.

FIG. 1 is a circuit diagram indicating the composition of main portions of one example of a xenon discharge lamp lighting device relating to this invention. This xenon discharge lamp lighting device is for lighting a xenon discharge lamp 1 used in a projecting image device.

In this Figure, a DC power source circuit 10 converts alternating current supplied from an AC power source (not pictured) into direct current, and inputs the direct current into the xenon discharge lamp. This DC power source circuit 10 is provided with a transformer T, a commutating circuit 11 comprising a plurality of commutators D, and a smoothing circuit 12 comprising a choke coil L and a capacitor C. The output terminal of this DC circuit 10 is electrically connected to a xenon discharge lamp 1.

A current controller 20 controls the current input into the xenon discharge lamp 1, in which a first control circuit 21 is provided that detects the lamp voltage for a xenon discharge lamp 1 and controls the power input into the xenon discharge lamp 1 based on the detected lamp voltage. A second control circuit 22 provides constant power control such that the power value input into the xenon discharge lamp 1 is constant, and a switch 23 provides switching between a control operation using the first control circuit and a control operation using the second control circuit.

A current adjusting signal circuit 30 amplifies the current control signal from the current controller 20, controlling the DC power source circuit 10 to adjust the current output from the DC power source circuit 10. This current adjusting signal circuit is provided with an amplifier 31, a pulse width modulator 32, and a field effect transistor 33.

In this type of lighting device, an alternating current is input into the DC power source circuit 10 from a 100V or 200V single phase AC power source or three-phase AC power source, and after alternating current is converted into direct current in the DC power source circuit 10, the direct current is input into the xenon discharge lamp 1, which starts and lights the xenon discharge lamp 1. At this point, the current controller 20 detects the lamp voltage for the xenon discharge lamp 1.

Thus, during the time from the completion of the rush current supply time period after starting the xenon discharge lamp 1 until a preset specific time T has passed, a control operation of the first control circuit 21 in the current controller 20 controls the input current into the xenon discharge lamp 1 based on the detected lamp voltage for the xenon discharge lamp 1.

A detailed explanation follows below, referring to FIG. 2.

Figure 2:
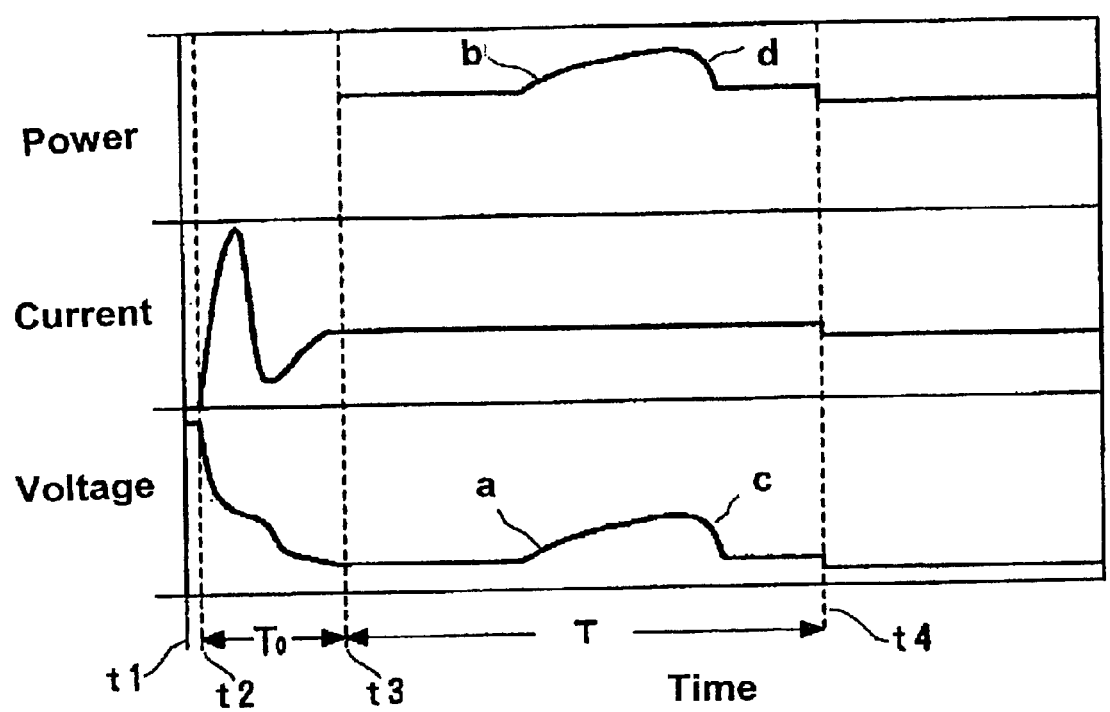
FIG. 2 is a graph showing the input power, input current, and lamp voltage upon lighting a xenon discharge lamp using a lighting device with the structure shown in FIG. 1.

In FIG. 2, the left vertical solid line t1 indicates a certain point in time before starting the xenon discharge lamp 1, and at the point in time indicated by this solid line t1, the lamp input power and lamp current are both 0. As for the lamp voltage, for a xenon discharge lamp 1 for which the rated drive lamp voltage is about 25V, for example, a no-load voltage of about 130V is applied.

The first vertical dotted line from the left t2 indicates the starting time for the lighting igniter. In conjunction with the starting of this lighting igniter, a dielectric breakdown occurs between the electrodes of the xenon discharge lamp 1, followed by a rush current. The supply time period T0 for this rush current is at least 400 microseconds or more, and no special electrical control can be performed during said supply time period T0.

The second vertical dotted line from the left t3 is the ending point of the rush current supply time period, as well as the starting point of electrically controlling the lighting of the xenon discharge lamp 1. In the present invention, when the lamp voltage increases beyond the standard voltage for the rated drive voltage between the point indicated by the dotted line t3 and the passing of a specified time T, the input power into the xenon discharge lamp is controlled to increase in accordance with this increase amount.

The third dotted line from the left t4 indicates the point when the specified time T has passed, and in the present invention, constant power control begins from the time indicated by this dotted line t4.

After the xenon discharge lamp 1 is started and the rush current supply period is completed, the arc formed in the xenon discharge lamp 1 becomes unstable. When the lamp voltage increases as shown in FIG. 2 label (a), the input power is controlled to increase in accordance with the lamp voltage increase amount as shown in FIG. 2 label (b). Meanwhile, as the arc formed in the xenon discharge lamp 1 stabilizes, and the lamp voltage drops as shown in FIG. 2 label (c), the input power is controlled downward in accordance with the lamp voltage decrease amount as shown in FIG. 2 label (d). Thus a stable arc is formed in the xenon discharge lamp 1.

After a specified time T has passed after the xenon discharge lamp 1 is started and the rush current supply period is completed, a switching signal from a switch 23 switches from the control operation of the first control circuit 21 to the control operation of the second control circuit 22, which provides constant power control such that the input power into the xenon discharge lamp 1 is at a constant value.

In the above, the specified time T, which is the time during which the input power into the xenon discharge lamp is controlled to increase in accordance with the lamp voltage increase amount, should preferably be 50 milliseconds or more, or more preferably 300 to 2000 milliseconds. When the specified time T is shorter than 50 milliseconds, the switch to constant power control could occur before a stable arc is formed in the xenon discharge lamp 1, which could easily increase the probability of lamp lighting failures.

Also, the input current after the xenon discharge lamp 1 is started and the rush current supply is completed and before the specified time T has passed (hereafter also called "starting current") should preferably be controlled to 80–150% of the rated drive input current value.

When this starting current value is too small, the xenon discharge lamp 1 discharge becomes difficult to maintain, which could easily increase the probability of lamp lighting failures. And when this starting current value is too large, the damage inflicted on the electrodes in the xenon discharge lamp 1 is increased, which could cause premature damage to the electrodes themselves, or prematurely blacken the bulb with a substance flying from the electrodes, which could shorten the useful life of the xenon discharge lamp 1.

The xenon discharge lamp lighting device above will use the first control circuit 21 in the current controller 20 to control the input power in accordance with the lamp voltage increase amount in the xenon discharge lamp 1, during the time between completing the rush current supply time period after starting the xenon discharge lamp 1 and the passage of a specified time T. Therefore, even when the arc in the xenon discharge lamp 1 becomes unstable and causes a lamp voltage increase, the input voltage does not accordingly decrease. This enables reliable stabilization of the arc, which can control or prevent lighting failures when starting the lamp, even when lighting a xenon discharge lamp 1 nearing the end of its useful life.

In addition, after starting the xenon discharge lamp 1 and completing the rush current supply time period and after the specified time T has passed, the second control circuit 22 in the current controller 20 provides constant power control, eliminating the need for excessive power input, and allowing a decreased maximum input power and a smaller device.

The xenon discharge lamp lighting device in the present invention is not limited to the embodiment described above, and can be revised as appropriate.

For example, a DC power source circuit could entail a variety of circuit compositions.

And a variety of control circuits could be used for the first control circuit in the current controller, provided that the lamp voltage increase amount in the xenon discharge lamp is detected, and the input current is controlled such that the input power increases based on the lamp voltage increase amount.

EXPERIMENTS

A xenon lamp lighting device relating to the present invention was produced according to the circuit composition indicated in FIG. 1 (hereafter, this lighting device is called "lighting device A"), and the following test xenon discharge lamp was prepared.

Test Xenon Discharge Lamp:

A xenon discharge lamp with an anode 15 mm in diameter and 25 mm in length, a cathode 6 mm in diameter and 15 mm in length, an electrode spacing of 3 mm, a xenon charging pressure of 2 MPa, a rated lamp voltage of 25V, and a rated lamp current of 65 A, for which 100 hours of lighting time has elapsed.

Sample Experiment 1

The test xenon discharge lamp above was connected to the lighting device A. The specified time T was set to 1 second, and the starting current was set to 65–75 A (100–115% of rated drive). With conditions under which the constant power-controlled power value would be 1600 W, the test xenon discharge lamp was lit a total of 1000 times, and the number of startup lamp lighting failures (hereafter "number of lighting failures") and the probability of lighting failure occurrence (hereafter "lighting failure rate") were measured.

This resulted in 1 lighting failure and a lighting failure rate of 0.1%, confirming that lamp startup lighting failures are extremely rare using the lighting device A.

In addition, a conventional constant power-controlled lighting device was used in place of the lighting device A, and with conditions under which the constant power-controlled power value would be 1600 W, the test xenon discharge lamp was lit a total of 1000 times, and the number of lighting failures and the lighting failure rate were measured.

The number of lighting failures was 136, with a lighting failure rate of 13.6%, which is a frequent occurrence of lamp lighting failures upon startup.

Sample Experiment 2

Setting the specified time T to 1 second, and setting the starting current according to Chart 1 below, with conditions under which the constant power-controlled power value would be 1600 W, the lighting device A was used to light the test xenon discharge lamp a total of 1000 times, and the number of lighting failures and the lighting failure rate were measured.

Results are shown in Chart 1. Also, FIG. 3 indicates the starting current percentage relative to the rated drive current, and its relationship to the lighting failure rate.

Chart 1

| Starting current | | Number of | |
|---|---|---|---|
| Setting values | Percentage of rated drive current | lighting failures | Lighting failure rate |
| 25A | 38% | 1000 times | 100% |
| 30A | 46% | 536 times | 53.6% |
| 35A | 54% | 248 times | 24.8% |
| 40A | 62% | 152 times | 15.2% |
| 45A | 69% | 25 times | 2.5% |
| 50A | 77% | 3 times | 0.3% |
| 55A | 85% | 1 time | 0.1% |
| 60A | 92% | 2 times | 0.2% |
| 65A | 100% | 1 time | 0.1% |
| 70A | 108% | 0 times | 0% |
| 80A | 123% | 0 times | 0% |
| 90A | 138% | 1 time | 0.1% |
| 100A | 154% | 0 times | 0% |

Figure 3:
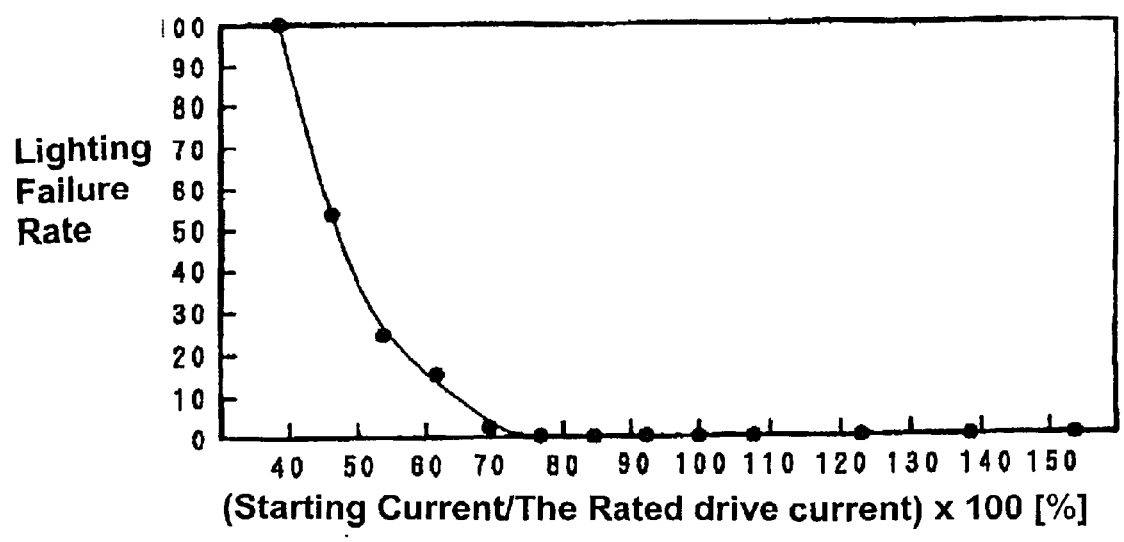
FIG. 3 is a graph showing the starting current percentage relative to the rated drive current, and the relationship to the lighting failure rate.
Figure 4:
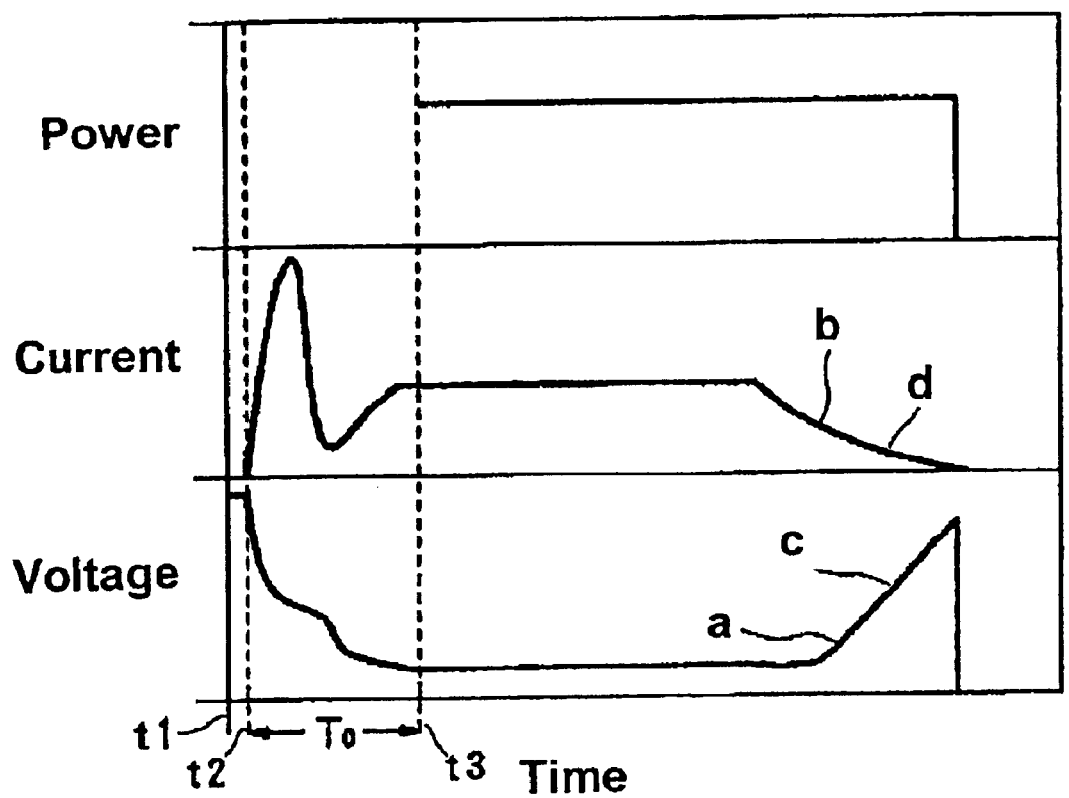
FIG. 4 is a graph showing the input power, input current, and lamp voltage changes in a conventional constant power controlled lighting device, when a xenon discharge lamp is started and a lighting failure occurs.

As made clear by Chart 1 and FIG. 3, it was confirmed that the lighting failure rate decreases as the starting current setting value increases, and that by setting the starting current value to 80% or more of the rated drive input current, the lighting failure rate becomes extremely small.

As explained above, the xenon discharge lamp lighting device in the present invention controls the input voltage to increase in accordance with the lamp voltage increase amount in a xenon discharge lamp, during the time period from completion of the rush current supply time period occurring after starting the xenon discharge lamp, and until the specified time T has passed. Therefore, even when lamp voltage increases because of the arc becoming unstable, this will not decrease the input current, which allows reliable arc stabilization. Thus, lamp startup lighting failures can be controlled or prevented even when lighting a xenon discharge lamp nearing the end of its useful life.

In addition, after the xenon discharge lamp is started and the rush current supply time period is completed and the specified time T has passed, constant power control is provided, eliminating the need for excessive input power, which allows a smaller maximum input power and a smaller device.

The disclosure of Japanese Patent Application No. 2001-319144 filed on Oct. 17, 2001 including specification, drawings and claims is incorporated herein by reference in its entirety.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A direct-current xenon discharge lamp lighting device comprising:

a lighting device for lighting a direct-current xenon discharge lamp wherein when a lamp voltage for said direct-current xenon discharge lamp increases in a predetermined time period T, an input power is increased in accordance with said lamp voltage increase amount so that constant current control is provided, and wherein the predetermined time period T occurs during a lighting phase of the xenon discharge lamp and begins at the ending point of a rush current supply time period, which occurs when the lighting of the xenon discharge lamp is electrically controlled.

2. The direct-current xenon discharge lamp lighting device according to claim 1, wherein in the predetermined time period T occurring during a lighting phase of the xenon discharge lamp and begins at the ending point of the rush current supply time period, an input current is controlled to 80–150% of a rated drive input current.

3. The direct-current xenon discharge lamp lighting device according to claim 1, wherein the predetermined time T is 50 milliseconds or more.

4. The direct-current xenon discharge lamp lighting device according to claim 2, wherein the predetermined time T is 50 milliseconds or more.

* * * * *